United States Patent
Shimoda

(10) Patent No.: US 11,771,990 B2
(45) Date of Patent: *Oct. 3, 2023

(54) GAME PROGRAM, GAME PROCESSING METHOD, AND INFORMATION PROCESSING APPARATUS

(71) Applicant: GREE, Inc., Tokyo (JP)

(72) Inventor: Shota Shimoda, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,433

(22) Filed: Feb. 24, 2022

(65) Prior Publication Data
US 2022/0176246 A1    Jun. 9, 2022

Related U.S. Application Data

(63) Continuation of application No. 16/816,638, filed on Mar. 12, 2020, now Pat. No. 11,285,391, which is a
(Continued)

(30) Foreign Application Priority Data

Aug. 27, 2014   (JP) ................................ 2014-172442

(51) Int. Cl.
*A63F 13/537*    (2014.01)
(52) U.S. Cl.
CPC .... *A63F 13/537* (2014.09); *A63F 2300/6045* (2013.01)
(58) Field of Classification Search
CPC .................................................... A63F 13/537
See application file for complete search history.

(56) References Cited

U.S. PATENT DOCUMENTS

2003/0186741 A1* 10/2003 Hayashida ............. A63F 13/53
463/31
2005/0176486 A1   8/2005 Nishimura et al.
(Continued)

FOREIGN PATENT DOCUMENTS

JP    2007244540 A    9/2007
JP    2012-252531 A   12/2012

OTHER PUBLICATIONS

"IOS / Android "disappearance City" limited quest "month of tears and Kaito team" is starting! Deals privilege is get CM broadcast commemoration campaign", gamer, Jun. 13, 2014, URL: http://www.gamer.ne.jp/news/201406130063/.
(Continued)

*Primary Examiner* — David L Lewis
*Assistant Examiner* — Robert E Mosser
(74) *Attorney, Agent, or Firm* — Maier & Maier, PLLC

(57) ABSTRACT

A game program causes a computer to implement: a screen information generating function of generating information for displaying, in a display area of a game screen, a field where a plurality of objects is arranged, a character capable of moving in the field, and a game medium having certain status information; and an instruction accepting function of accepting from a user an instruction regarding an operation of the character. The screen information generating function further includes a preceding object information generating function of generating information for displaying, in the display area of the game screen, preceding object information regarding a plurality of objects arranged in the display area as the character moves.

20 Claims, 12 Drawing Sheets

Related U.S. Application Data continuation of application No. 14/832,022, filed on Aug. 21, 2015, now Pat. No. 10,625,159.

(56) References Cited

U.S. PATENT DOCUMENTS

| | | |
|---|---|---|
| 2005/0266908 A1 | 12/2005 | Hattori et al. |
| 2005/0277456 A1 | 12/2005 | Mizuguchi et al. |
| 2009/0015677 A1 | 1/2009 | Harrington |
| 2009/0270175 A1 | 10/2009 | Kelly et al. |
| 2010/0304857 A1* | 12/2010 | Suzuki .................. A63F 13/573 463/31 |
| 2011/0165940 A1 | 7/2011 | Kira et al. |

OTHER PUBLICATIONS

"Title that is used in the new TV CM of Google Play is it!", Famitsu App, Jun. 13, 2014, URL: http://app.famitsu.com/20140613_392852/.

"Glee and the Wright Flyer Studios, held the "disappearance city" is 500 000 DL topped . . . delivery one month thanks campaign and the feature-length story events "Remembrance of Things Past"", Social Game Info, Jun. 24, 2014, URL: http://gamebiz.jp/?p=131666.

""Disappearance City" new event "Remembrance of Things Past" in all 70 Quest feature-length story", Famitsu.com, Jun. 24, 2014, URL: http://app.famitsu.com/20140624_399037/.

""Disappearance City" 500 000 DL breakthrough. New event the start of the commemoration campaign and all 70 Quest", 4Gamer. net, Jun. 24, 2014, URL: http://www.4gamer.net/games/254/G025402/20140624055/.

""Disappearance city" was released one month at 500 000 DL breakthrough! Delivery month thanks campaign & the first feature-length story quest "A la recherche du temps perdu" was held", 9-Bit, Jun. 24, 2014, URL: http://9-bit.jp/archives/64343.

"Wright Flyer first series title of Studios "disappearance city", topped 50 million downloads", vsmedia, Jun. 24, 2014, URL: http://vsmedia.info/2014/06/24/shoumetsutoshi_50/.

"IOS / Android "disappearance city" is total 500 000 topped the download! also start special Quest & feature stories Rainbow evolution material to drop always", Gamer, Jun. 24, 2014, URL: http://www.gamer.ne.jp/news/201406240038/.

""Disappearance City" 500,000 downloads surpassed! It is always the appearance of 4 or more of Angel ★ in guerrilla Quest", gpara.com, Jun. 24, 2014, URL: http://www.gpara.com/infos/view/13574.

""disappearance City" to break through the 500 000 DL! Held delivery one month thanks campaign from Jun. 24 (Tuesday)! Feature story start of all 70 quest that becomes this work first!", gamegift, Jun. 24, 2014, URL: http://gamegift.jp/3093/.

""Disappearance City" one million downloads topped! Held "escape from the cursed abandoned factory" new events to challenge the mystery of escape game", gpara.com, Jul. 9, 2014, URL: http://www.gpara.com/infos/view/14129.

"Wright Flyer first series title of Studios "disappearance city", to break through the one million downloads", vsmedia, Jul. 9, 2014, URL: http://vsmedia.info/2014/07/09/shoumetsutoshi_1m/.

""Annihilation city" has surpassed one million DL! It held the "escape from the cursed abandoned factory" new event", Gamer, Jul. 9, 2014, URL: http://gamegift.jp/3255/.

"IOS / Android "disappearance City" one million downloads topped! Be held "Escape from cursed abandoned factory" new event", Gamer, Jul. 9, 2014, URL: http://www.gamer.ne.jp/news/201407090029.

""Annihilation city" is topped 1 million DL! And held the "escape from the cursed abandoned factory" new events than today! Whatever experience the hands-on drama event "yourself" is solve the mystery!", 9-Bit, Jul. 9, 2014, URL: http://9-bit.jp/archives/67197.

""Disappearance City" one million DL breakthrough. Events that solving the mystery to escape from the waste plant is held", 4Gamer.net, Jul. 9, 2014, URL: http://www.4gamer.net/games/254/G025402/20140709048/.

""Disappearance City" of Wright Flyer Studios has topped one million DL! Start the "escape from the cursed abandoned factory" hands-drama events", Social Game Info, Jul. 9, 2014, URL: http://gamebiz.jp/?p=132204.

"Glee, Wright Flyer studio first series title "annihilation city" has surpassed one million DL.", AppliBiz, Jul. 9, 2014, URL: http://www.applibiz.net/3300/.

"And held the "disappearance city" one million DL breakthrough—"Escape from cursed abandoned factory" new event", Weekily Aschi, Jul. 9, 2014, URL: http://weekly.ascii.jp/elem/000/000/236/236146/.

Japanese office action dated Nov. 17, 2015 of corresponding application No. JP2015-172615, 15 pgs.

Japanese office action dated Feb. 23, 2016 of corresponding application No. JP2015-172615, 7 pgs.

Japanese office action dated Jun. 2, 2015 of corresponding application No. JP2015-172442, 11 pgs.

"The [game played today] run action × RPG! Chase the mystery of the city had disappeared along with the mule and girls "disappear city"", Appget, May 27, 2014, URL: http://appget.com/c/news/59365/pickup20140527/.

"Annihilation city Celebration 1 anniversary! Drama × orchid action × RPG fusion of a miracle!", Appget, May 27, 2014, URL: http://appget.com/appli/view/64517.

"GREE expectations of new "disappearance City" release. If it not a Pochipochi . . . ?", gamecast, May 28, 2014, URL: http://www.gamecast-blog.com/archives/65794029.html.

"Disappearance city: action, drama and RPG,! Story that was built that there is no game system ever attractive a blockbuster! Free", OCTOBA, May 28, 2014, URL: http://octoba.net/archives/20140528-android-app-shoumetsu-317495.html.

"And held the "disappearance City" TVCM Memorial campaign. The free distribution two Fukuzawa", 4Gamer.net, Jun. 13, 2014, URL: http://www.4gamer.net/games/254/G025402/20140613070/.

"Sugita Tomokazu, dramatic RPG "disappearance city" of Hanazawa Kana appearances in Google Play™ TV CM! In within the app to "Google Play™ CM aired Memorial Campaign" held", 9-Bit, Jun. 13, 2014, URL: http://9-bit.jp/archives/62471.

""Disappearance City" of Wright Flyer Studios appeared in TV CM of Google Play . . . held a commemorative event campaign", Social Game Info, Jun. 13, 2014, URL: http://gamebiz.jp/?p=131306.

"RPG that was new interpretation runner game "disappearance City"", Game Watch, May 29, 2014, http://game.watch.impress.co.jp/docs/news/20140529_650758.html.

[Bacteriostatic of the game play-by-play] The first challenge to Sumahogemu "disappearance City"!, Youtube/SeikinGames, May 30, 2014, http://www.youtube.com/watch?v=cYpL2IJq-0c.

"[Annihilation city cheats] Let Kiwameyo a mule! Introduce efficient point do a action !!", AppBank, Jun. 1, 2014, http://www.appbank.net/2014/06/01/iphone-application/827065.php.

"Annihilation city", iPhone AC, Jun. 2, 2014, http://iphoneac-blog.com/archives/8398964.html.

"Wearing of exhilarating action by typing in May disease eliminated!", Famitsu App, Jun. 2, 2014, http://app.famitsu.com/20140602_383305/.

"[Annihilation city cheats] day quest and guerrilla capture data summary of the quest.", AppBank, Jun. 3, 2014, http://www.appbank.net/2014/06/03/iphone-application/831100.php.

"[Annihilation city cheats] and trying to evolve to strengthen the soul. The strength of feelings is the strength of the soul!", AppBank, Jun. 4, 2014, http://www.appbank.net/2014/06/04/iphone-application/827895.php.

"Point when [annihilation city cheats] to organize the soul. !! Let's make a good team of balance", AppBank, Jun. 6, 2014, http://www.appbank.net/2014/06/06/iphone-application/831121.php.

"[Annihilation city cheats] annihilation city play, capture information together.", AppBank, Jun. 8, 2014, http://www.appbank.net/2014/06/08/iphone-application/833645.php.

(56) References Cited

OTHER PUBLICATIONS

"[Annihilation city cheats] early If you read this Marutto introduction !! the point at which the weather the pat! Early", AppBank, Jun. 8, 2014, http://www.appbank.net/2014/06/08/iphone-application/832561.php.

"The first series title "annihilation city" is a big hit! "Wright Flyer Studios" interview! "Heavens and the earth and the goddess of magic" in the upcoming release also was amazing!", Apri Get, Jun. 13, 2014, http://appget.com/c/news/original/60613/wrightflyerstudios/.

"[Annihilation city diary] 2nd hot? No, it is hot!", Famitsu App, Jun. 13, 2014, http://app.famitsu.com/20140613_388347/.

"Suddenly disappear Tokiakase the mystery of the cities. "Action drama × × RPG" sing-play reports of the "disappearance City"", 4Gamer.net, Jun. 20, 2014, http://www.4gamer.net/games/254/G025402/20140619118/.

"Find out the mystery of the disappeared city!", Aschi, Jul. 1, 2014.

"Disappeared Chase the mystery of the city was gone! | There are AppBank", SyuasuPlus, Jul. 2, 2014, http://iphone.ascii.jp/2014/07/02/appbank986/.

"Dramatic action RPG that draw the journey of the girl and couriers "disappearance City"", Madonomori, Jul. 2, 2014, http://www.forest.impress.co.jp/docs/serial/androidlab/20140702_655980.html.

"[Annihilation city diary] is Sagure 3rd 3. challenge stage capture method in the video!", FamitsuApp, Jul. 4, 2014, http://app.famitsu.com/20140704_402410/.

"[Annihilation city cheats] enemy soul and boss list together that appear to Chapter 1, "looking for a companion."", AppBank, Jul. 8, 2014, http://www.appbank.net/2014/07/08/iphone-application/853656.php.

"[Annihilation city cheats] enemy soul and boss list summarizes which appears in Chapter 2, "evolution"", AppBank, Jul. 10, 2014, http://www.appbank.net/2014/07/10/iphone-application/854584.php.

"[Annihilation city cheats] Chapter 3 enemy soul and boss list together that appear in "to Lost"", AppBank, Jul. 12, 2014, http://www.appbank.net/2014/07/12/iphone-application/854676.php.

"[Annihilation city] Shun-kun play! The challenge to the Chapter 1!", Youtube/AppBank, Jul. 12, 2014, http://youtu.be/9jk5vycWZ10?list=PLslzVnyLU056j0PQfNN211Gaspr9Z9BnL.

"[Annihilation city cheats] soul list together to drop in each story", AppBank, Jul. 14, 2014, http://www.appbank.net/2014/07/14/iphone-application/854258.php.

"This week's game applications for the smartphone", Aschi, Jul. 15, 2014.

"[Annihilation city diary] challenge the 4th day of the week Quest senior", Famitsu App, Jul. 16, 2014, http://app.famitsu.com/20140715_408957/.

"[Annihilation city cheats] material list together necessary to the evolution of the soul", AppBank, Jul. 16, 2014, http://www.appbank.net/2014/07/16/iphone-application/858916.php.

"[Annihilation city] Shun-kun challenge in tree party in Chapter 2!", Youtube/AppBank, Jul. 16, 2014, https://www.youtube.com/watch?v=wykaltPeVjw.

"[Annihilation city cheats] mission and its remuneration summary of each story", AppBank, Jul. 16, 2014, http://www.appbank.net/2014/07/18/iphone-application/860502.php.

"[Annihilation city diary] to eat the 5th challenge quest!", Famitsu App, Jul. 18, 2014, http://app.famitsu.com/20140718_411449/.

"Shoumetsu Toshi", Entermix, Jul. 19, 2014.

"[Annihilation city cheats] good level up efficient Quest & each quest of experience value efficiency together.", AppBank, Jul. 21, 2014, http://www.appbank.net/2014/07/21/iphone-application/861312.php.

"[Annihilation city cheats] recommended without charging play soul will Susumeyo the story by collecting This is it! Strong soul!", AppBank, Jul. 23, 2014, http://www.appbank.net/2014/07/23/iphone-application/861599.php.

"Tips [annihilation city cheats] boss fight capture. Shalt reduce the number of chain and deliberately attacked by a weak enemy!", AppBank, Jul. 25, 2014, http://www.appbank.net/2014/07/25/iphone-application/863258.php.

"[Annihilation city information] but also in the event at the new character will get 14 sheets maximum additional!", AppBank, Aug. 15, 2014, http://www.appbank.net/2014/08/15/iphone-application/875459.php.

"[Annihilation city news] case get the start! Super powerful soul descent quest "chaos of the game master" is Aug. 17!", AppBank, Aug. 16, 2014, http://www.appbank.net/2014/08/16/iphone-application/873108.php.

"[Annihilation city news] case get the start! Super powerful soul descent quest "chaos of the game master" is Aug. 17!", AppBank, Aug. 19, 2014, http://www.appbank.net/2014/08/19/iphone-application/877022.php.

""Disappearance City" ★ 5 special quest appearance of evolution possible healing soul winning chance!", Famitsu App, Jul. 29, 2014, URL: http://app.famitsu.com/20140729_416899/.

"Wright Flyer Studios, "annihilation city" in the delivery of high difficulty quest of 24-hour limit . . . first ★ 6 soul also appeared!", Social Game Info, Jul. 29, 2014, URL: http://gamebiz.jp/?p=132880.

""Disappearance City", appeared in the 24-hour limit in ultra-high difficulty of "Advent Quest" is Aug. 1", 4Gamer.net, Jul. 29, 2014, URL: http://www.4gamer.net/games/254/G025402/20140729052/.

""Disappearance City" first ★ 6 soul emergence of ultra-Expert descent quest "???? (Degree of difficulty ☆☆)" held decision! ★ 5 evolvable healing soul special quest "I Am the live love loved" the appearance in also held", 9-Bit, Jul. 29, 2014, URL: http://9-bit.jp/archives/70827.

"Annihilation city", gamer, Jul. 29, 2014, URL: http://www.gamer.ne.jp/news/201407290031/.

"24 hours limited to "disappear city", an ultra-high degree of difficulty quest appeared!", BoomAppGames, Jul. 29, 2014, URL: http://game.boom-app.com/entry/shoumetsu-event20140729.

""Disappearance City" ★ 5 evolvable healing soul special quest that appeared appeared!", Aprinomajin, Jul. 29, 2014, URL: http://appmajin.com/pc/news_detail.php?aid=2046.

"Pre-registration accepted start of drama × action × RPG "disappearance City"!", Boom App Games, Apr. 18, 2014, URL: http://game.boom-app.com/entry/shoumetsu-pre.

"Hunt for mysterious city disappeared! Pre-registration of "annihilation city" the start. With play videos of Max Murai! [PR]", AppBank, May 3, 2014, URL: http://www.appbank.net/2014/05/03/iphone-application/806357.php.

"[Extinction city] and would introduce ahead of the new sense of action RPG pair!", Youtube/AppBank, May 3, 2014, URL: http://www.youtube.com/watch?v=8pKB0pYRnWI.

"[Animation] new studio the whole body of the debut! We approach the whole picture of a complete new genre "disappearance City"", FamitsuApp, May 3, 2014, URL: http://app.famitsu.com/20140503_364537/.

"Popular new! Thorough publish the early story to become "disappearance City" care", FamitsuApp, May 10, 2014, URL: http://app.famitsu.com/20140510_369014/.

"We approach the expectations's "disappearance City" unique soul skills and take advantage of surgery that holds the Battle of key", FamitsuApp, May 17, 2014, URL: http://app.famitsu.com/20140517_372744/.

"GREE I tried to play the "extinction city" in the new studio. Sound is exhilarating feeling well. How far you can go with momentum.", Saipro, May 26, 2014, http://toaru-sipro.com/?p=9181.

"GREE expectations of new "disappearance City" release. If it not a Pochipochi . . . ?", Gamecast, May 27, 2014, http://www.gamecast-blog.com/archives/65794029.html.

"Disappearance de Poti strategy's first bullet city reviews GREE stylish wind runner!", Axel Games, May 28, 2014, http://axelgames.net/2014/05/28/18527/.

"Disappearance City: disappeared surviving girl in the city and the man of the couriers who helped it. The road to truth runs through !! Free.", AppBank, May 29, 2014, http://www.appbank.net/2014/05/29/iphone-application/820853.php.

(56) References Cited

OTHER PUBLICATIONS

"[Annihilation city] Mamiruton & Max Murai is aiming to stage clear! Also draw Reagacha!", Youtube/AppBank, May 29, 2014, http://www.youtube.com/watch?v=EBXe6LlyF5U.

"Disappearance city—mystery system action RPG that is approaching the mystery of the vanished city gorgeous actors send", Boom App Games, May 29, 2014, http://game.boom-app.com/entry/shoumetsu-review.

Japanese Office Action dated Feb. 3, 2015 in corresponding Japanese Application No. 2014-172442; 4 pgs.

"Shometsutoshi Koryaku Hakobiyawo kiwameyo! Koritsuyoku akushon wo konasu pointo wo shokai!!", AppBank, Jun. 1, 2014, URL: http://www.appbank.net/2014/06/01/iphoneapplication/827065.php.

"Glee and the Wright Flyer Studios, action drama × × RPG is released a new app that fused "disappear city". Hanazawa Kana and Sugita Tomokazu such as also appointed gorgeous actors", Social Game Info, May 27, 2014, URL: http://gamebiz.jp/?p=130665.

"[New] Sugita Tomokazu & Hanazawa Kana play the leading role of "disappearance City" delivery start!", Famitsu App, May 27, 2014, URL: http://app.famitsu.com/20140527_380360/.

"Action & Drama & to start the delivery of the new sense of game the RPG fused "disappearance City"", 4Gamer.net, May 27, 2014, URL: http://www.4gamer.net/games/254/G025402/20140527023/.

""Disappearance City" delivery start! Sugita Tomokazu's, Hanazawa Kana's such gorgeous actors Starring! Action RPG where you can enjoy the story of "modern fantasy" in the simple operation", gpara.com, May 27, 2014, URL: http://www.gpara.com/infos/view/12509.

"Start trying to experience a new sense of action drama × × RPG-iOS / Android "disappearance city" is provided", gamer, May 27, 2014, URL: http://www.gamer.ne.jp/news/201405270016/.

"Glee, and deliver side-scrolling action game "disappearance City"", game watch, May 27, 2014, URL: http://game.watch.impress.co.jp/docs/news/20140527_650345.html.

"Sugita Tomokazu, dramatic RPG of Hanazawa Kana appearance! side-scrolling action RPG that mule and the mystery of the girl approaching the mystery of the city that was "Lost," "annihilation City" distribution start", 9-Bit, May 27, 2014, URL: http://9-bit.jp/archives/59968.

"New sense Sumahogemu "annihilation city" is the official release of "action drama × × RPG"", Syuasu plus, May 27, 2014, URL: http://weekly.ascii.jp/elem/000/000/224/224241/?utm_source=rss&utm_medium=rss&utm_campaign=%25e3%2582%25a2%25e3%2582%25af%25e3%2582%2567%25e3%2583%25a7%25e3%2583%25b3x%25e3%2583%2589%25e3%2583%25a9%25e3%2583%259exrpg%25e3%2581%25ae%25e6%2596%25b0%25e6%2584%259f%25e8%25a6%259a%25e3%2582%25b9%25e3%2583%259e%25e3%2583%259b%25e3%2582%25b2% . . . .

"Voice actor Tomokazu Sugita and Hanazawa Kana play a leading role "disappearance city". Wither enemy is too public Toka's salaried worker and amateur athletes", ApriGakuen, May 27, 2014, URL: http://appgaku.com/iphone-app/%E6%B6%88%E6%BB%85%E9%83%BD%E5%B8%82.

* cited by examiner

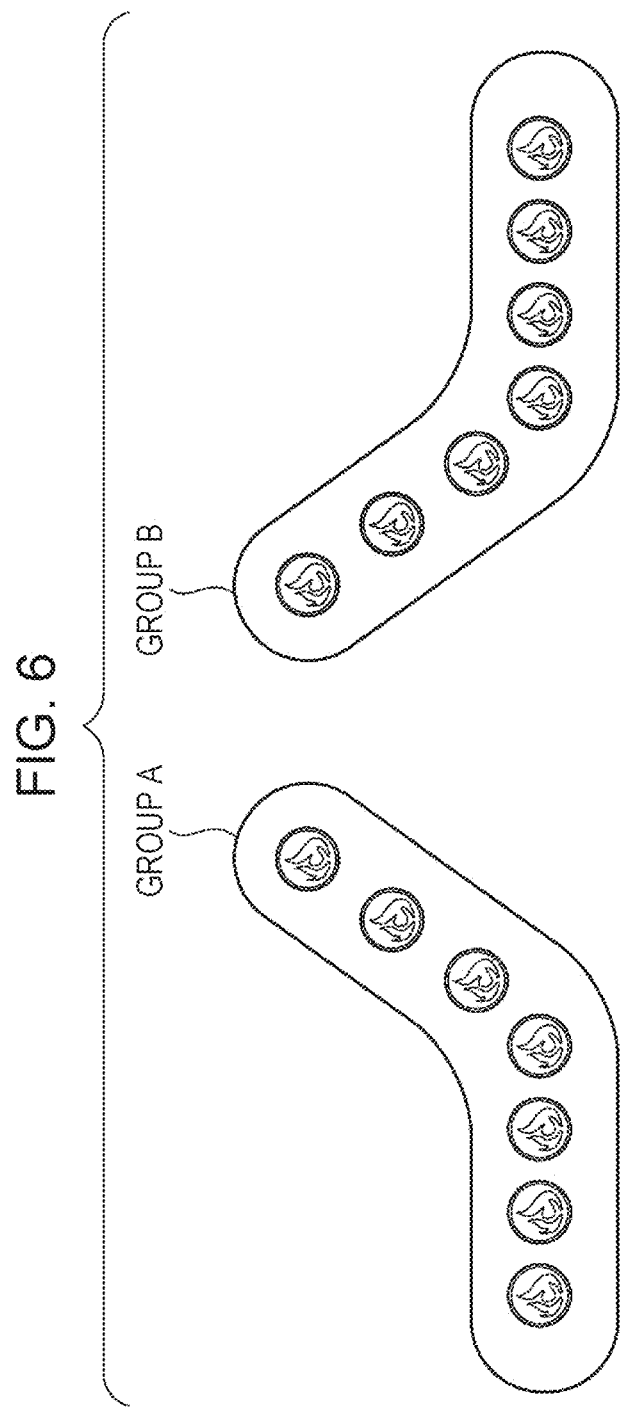

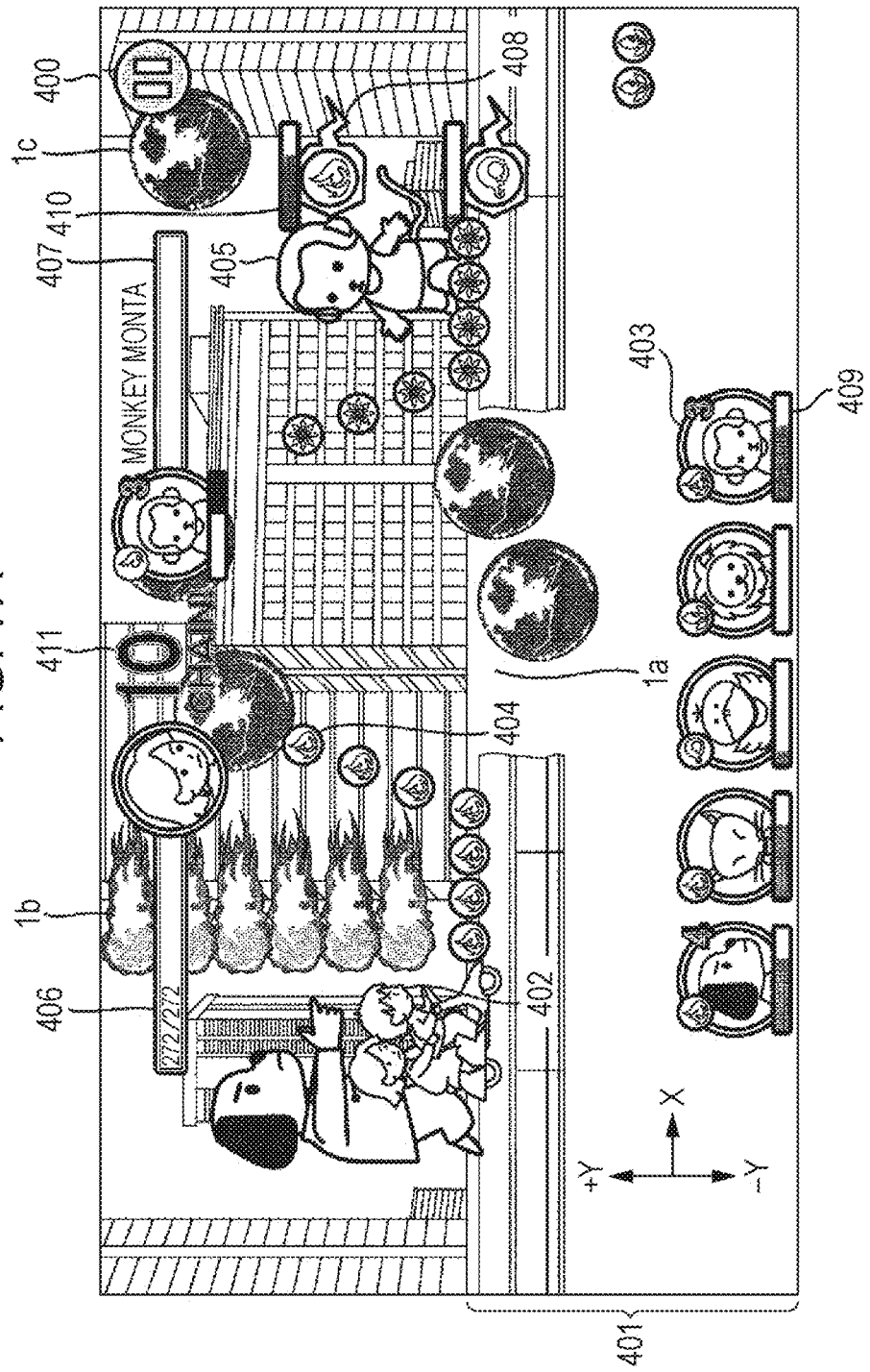

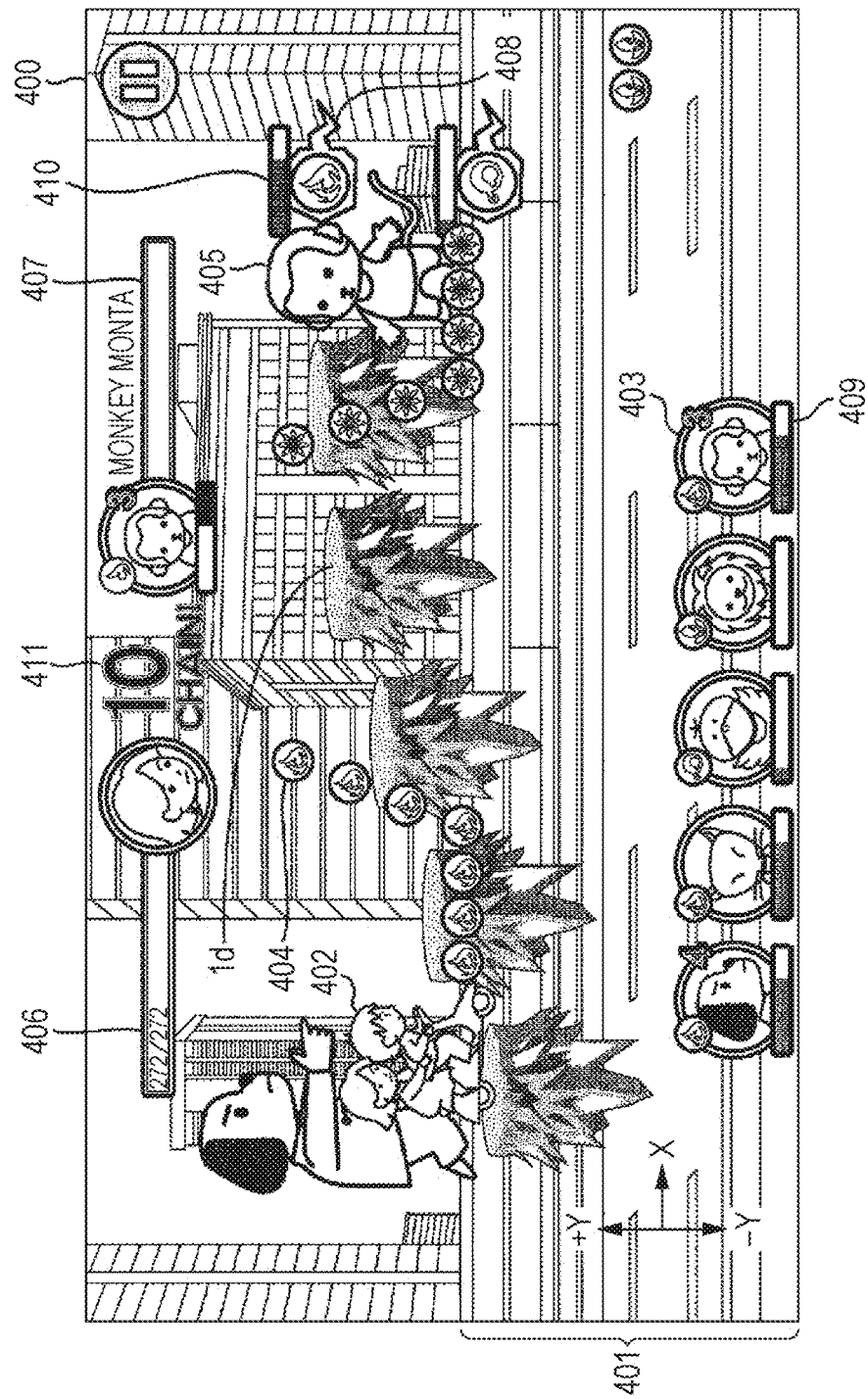

GAME PROGRAM, GAME PROCESSING METHOD, AND INFORMATION PROCESSING APPARATUS

CROSS-REFERENCE TO RELATED APPLICATIONS

This application is a continuation of U.S. patent application Ser. No. 16/816,638, filed on Mar. 12, 2020, entitled "Game program, game processing method, and information processing apparatus," which claims priority to U.S. patent application Ser. No. 14/832,022, now U.S. Pat. No. 10,625,159, filed on Aug. 21, 2015, entitled "Game program, game processing method, and information processing apparatus," which claims priority to Japanese Patent Application No. JP2014-172442, filed on Aug. 27, 2014, the entire contents of which are hereby incorporated by reference.

FIELD

Exemplary embodiments described here relate to a game program, a game processing method, and an information processing apparatus, and more particularly relate to a game program, a game processing method, and an information processing apparatus regarding a game in which a character can move in a field where a number of objects is arranged.

BACKGROUND

There have been known games called "run games" in which a character operated by a user moves at a certain speed from a start point to a goal point in a certain field, and the user competes with another user for points gained by obtaining an object such as a coin displayed in a display area of a game screen.

In such known run games, basically a game is played with the purpose of obtaining objects displayed in a display area, and no complex strategies are required.

In puzzle games where players compete for points gained by erasing objects such as blocks displayed in a display area of a game screen by aligning objects of the same color, technology that displays objects to be displayed next in the display area ahead of time is generally known.

Furthermore, an example of games other than puzzle games that display the statuses of objects outside a display area of a game screen ahead of time includes Japanese Unexamined Patent Application Publication No. 2007-244540, which discloses technology related to a ball game in which the user can grasp the positional relationship between a character outside a display area and a ball keep character.

SUMMARY

Accordingly, an exemplary embodiment described herein provides a game program, a game processing method, and an information processing apparatus related to a game with a user-friendly game screen where information necessary for devising a strategy is easy to view, while requiring a user to devise a highly complex strategy, by displaying information on an object outside a display area of the game screen ahead of time.

According to an exemplary embodiment, there is provided a game program that may cause a computer to implement: a screen information generating function of generating information for displaying, in a display area of a game screen, a field where a plurality of objects is arranged, a character capable of moving in the field, and a game content having certain status information; and an instruction accepting function of accepting from a user an instruction regarding an operation of the character. The screen information generating function can further include a preceding object information generating function of generating information for displaying, in the display area of the game screen, preceding object information regarding a plurality of objects arranged in the display area as the character moves.

The status information may include integrated information related to a status of the game medium.

The screen information generating function may further include an integrated information generating function of generating information for displaying, in the display area of the game screen, together with the preceding object information displayed by the preceding object information generating function, integrated information on the game medium corresponding to a corresponding one of a plurality of objects arranged in the display area as the character moves.

The preceding object information may include attribute information on a corresponding one of a plurality of objects arranged in the display area as the character moves. The integrated information may include attribute information on the game medium. The integrated information generating function may generate information for displaying integrated information on the game medium including attribute information that matches attribute information on a corresponding one of a plurality of objects arranged in the display area as the character moves.

The game program may cause the computer to further implement an integrated information changing function of changing, in a case where the character in the display area contacts an object arranged in the field, integrated information on a game medium corresponding to the object that the character contacts.

The game program may cause the computer to further implement an action actuating function of causing, in a case where the integrated information satisfies a particular condition, a game medium corresponding to the integrated information to take an action.

The preceding object information generating function may generate information for displaying the preceding object information at a position forward in a direction of movement of the character in the display area.

The preceding object information generating function may generate information for displaying the preceding object information at a position corresponding to a position where the objects are arranged in the display area as the character moves.

The preceding object information generating function may display the preceding object information in accordance with a distance between the character and a number of objects arranged in the display area as the character moves or a relative speed of the character with respect to a plurality of objects arranged in the display area as the character moves.

The status information may further include information on an attack ability of the game medium. The game program may cause the computer to further implement an attack ability changing function of changing the attack ability of the game medium on the basis of contact circumstances of the character in the display area with an object arranged in the field.

The game may be a game in which a character operated by the user is forced to start moving at a certain speed from a start point in the field. The game program may cause the computer to further implement a speed changing function of changing a speed at which the character moves, on the basis of contact circumstances of the character in the display area with an object arranged in the field.

The game program may cause the computer to further implement a field changing function of changing, in a case where a particular condition is satisfied, the field to a field where disadvantages to be suffered by the character from the field are reduced.

The particular condition may be satisfied in a case where the character or an opponent of the character is making an attack.

According to another exemplary embodiment, there may be provided a game processing method causing a computer to process: a screen information generating step of generating information for displaying, in a display area of a game screen, a field where a plurality of objects is arranged, a character capable of moving in the field, and a game medium having status information including certain integrated information; and an instruction accepting step of accepting from a user an instruction regarding an operation of the character. The screen information generating step further can include a preceding object information generating step of generating information for displaying, in the display area of the game screen, preceding object information regarding a plurality of objects arranged in the display area as the character moves.

According to yet another exemplary embodiment, there may be provided an information processing apparatus including a screen information generator that generates information for displaying, in a display area of a game screen, a field where a plurality of objects is arranged, a character capable of moving in the field, and a game medium having status information including certain integrated information; and an instruction acceptor that accepts from a user an instruction regarding an operation of the character. The screen information generator can include a preceding object information generator that generates information for displaying, in the display area of the game screen, preceding object information regarding a plurality of objects arranged in the display area as the character moves.

According to a game program, a game processing method, and an information processing method according to the exemplary embodiments, a game with a user-friendly game screen where information necessary for devising a strategy is easy to view can be provided, while allowing a user to devise a highly complex strategy.

BRIEF DESCRIPTION OF THE DRAWINGS

FIG. 6 is a schematic diagram for describing a display example of objects.

FIG. 7a is an exemplary schematic diagram for describing traps.

FIG. 7b is an exemplary schematic diagram for describing traps.

DETAILED DESCRIPTION

An information processing apparatus according to exemplary embodiments will be described in detail with reference to the drawings.

Firstly, a configuration in which an information processing apparatus according to an exemplary embodiment functions as a mobile terminal, and a game program according to an exemplary embodiment is executed as a so-called native application (native game) by the mobile terminal will be described as a first embodiment.

Subsequently, a configuration in which the information processing apparatus according to an exemplary embodiment functions as a server apparatus, the game program according to an exemplary embodiment is partially or entirely executed as a so-called web application (web game) by the server apparatus, and the execution result is returned to the mobile terminal will be described as a second embodiment.

An information processing apparatus according to the first exemplary embodiment will be described with reference to exemplary FIGS. 1 to 9.

An information processing apparatus 100 according to the embodiment may be a mobile terminal capable of executing a game program including processing described below. The information processing apparatus 100 is not specifically limited to a mobile terminal as long as this device can execute the processing, and the information processing apparatus 100 may be, for example, a smart phone, a tablet terminal, a home video game machine, a mobile game machine, a personal computer, or other electronic devices, as desired.

Figure 1:
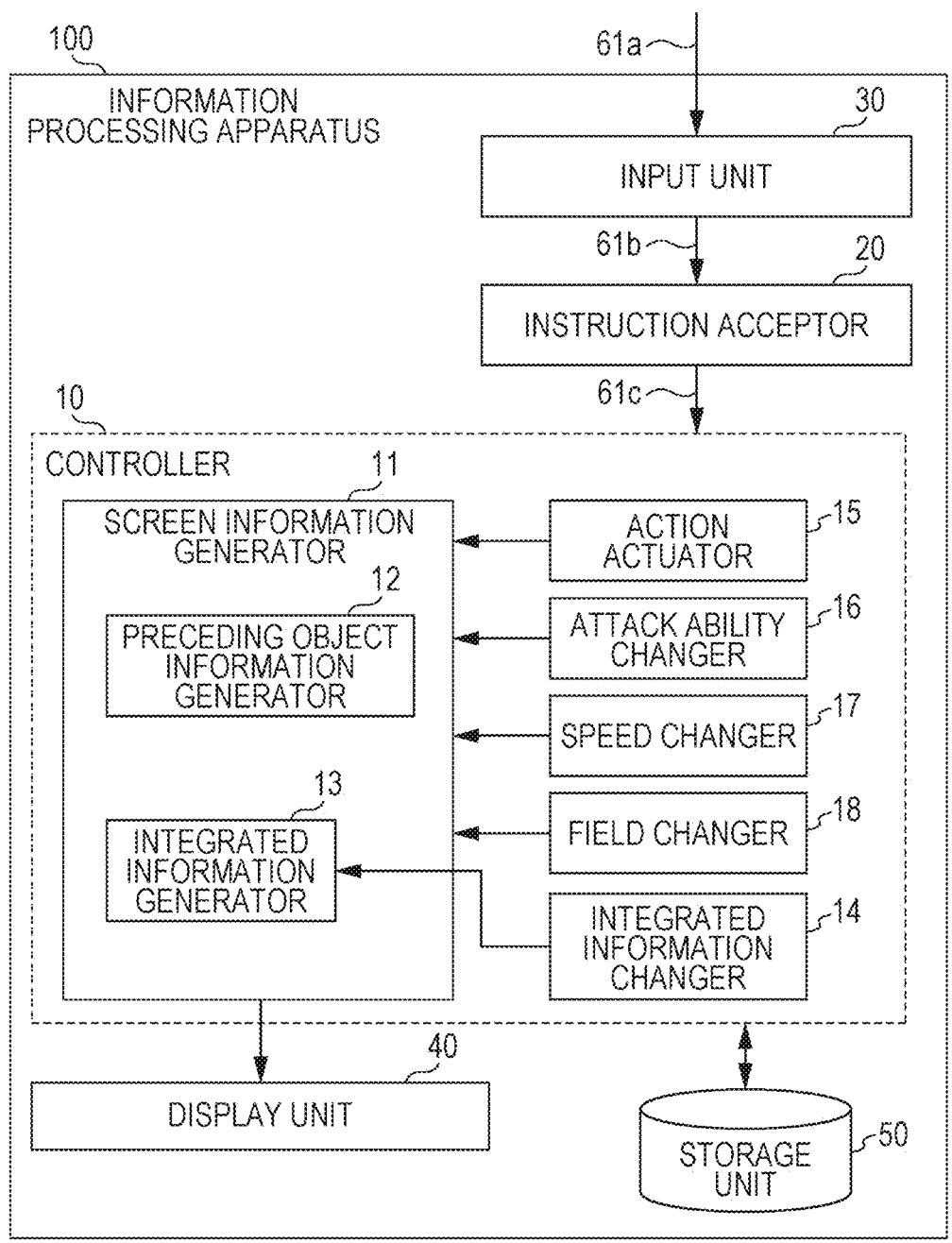
FIG. 1 illustrates an example of a schematic block diagram of an information processing apparatus according to a first embodiment of the present invention.

Exemplary FIG. 1 is a block diagram illustrating the main configuration of the information processing apparatus 100. As illustrated in exemplary FIG. 1, the information processing apparatus 100 may include a controller 10 and an instruction acceptor 20.

The controller 10 may be operable to control various functions of the information processing apparatus 100. The controller 10 may include a screen information generator 11.

Figure 2:
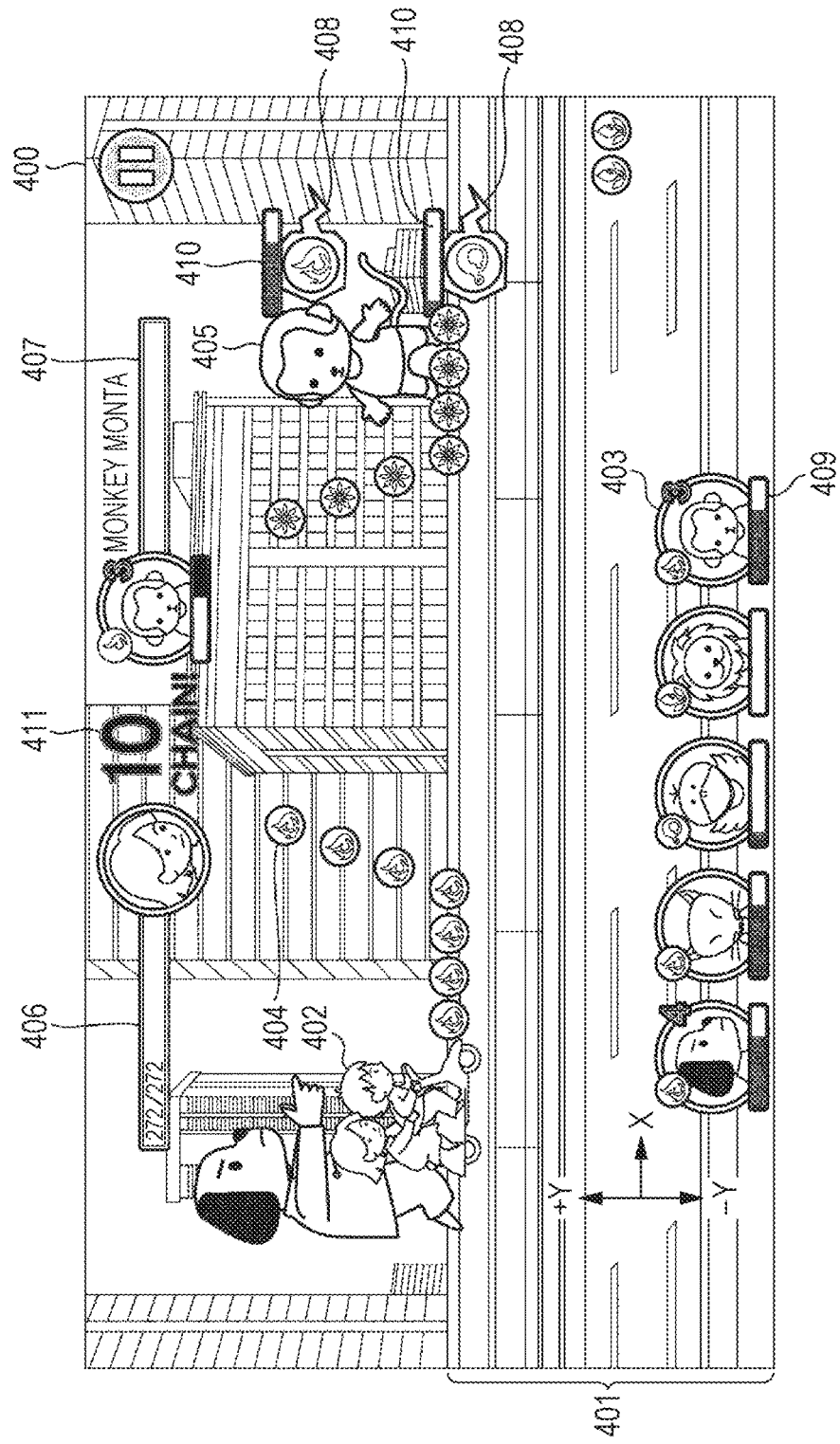
FIG. 2 is a schematic diagram illustrating an example of a game screen generated by the information processing apparatus.

Exemplary FIG. 2 schematically illustrates a display area of a game screen displayed on the basis of information generated by the screen information generator 11. As illustrated in exemplary FIG. 2, the screen information generator 11 can generate information for displaying a field 401, a character 402, and a game medium 403 in a display area 400 of the game screen.

A number of objects 404 may be arranged in the field 401.

The objects 404 may be circular, for example. However, the objects 404 are not limited to this shape and may have an arbitrary shape or shapes. In addition, attributes are set to the objects 404, and the objects 404 are colored in colors corresponding to the attributes. The objects 404 may include an object without an attribute for recovering the health of a character. Furthermore, the objects 404 may be displayed in units of multiple objects 404. Details will be described later in further exemplary embodiments.

The character 402 is capable of moving in the field 401.

The character 402 may be operated by a user, and the character 402 may represent, for example, a human being, an animal, and/or a vehicle, as desired. In a game implemented by the exemplary embodiment, the character 402 can combat an opponent 405. In addition, health, measured in hit points (HP), can be set for the character 402 and the opponent 405, and the HPs of the character 402 and the opponent 405 may be displayed as a character health gauge 406 and an opponent health gauge 407, respectively, in the display area 400.

Movement of the character 402 can include, for example, forced horizontal forward movement in the field 401 (a direction of the arrow X in exemplary FIG. 2), movement in a direction of a resultant vector obtained by combining a vertical upward (a direction of the arrow +Y in exemplary FIG. 2) vector based on a jump instruction given from the user, as will be described later, and a vector of the direction of the arrow X, and movement in a direction of a resultant vector obtained by combining a vertical downward (a direction of the arrow −Y in exemplary FIG. 2) vector based on a drop instruction given from the user, as will be described later, and a vector of the direction of the arrow X.

The game medium 403 can have certain status information.

The game medium 403 can be used for a combat between the character 402 and the opponent 405, and may represent, for example, a human being, an animal, and/or a vehicle, as desired. The game medium 403 may be stored in a later-described storage unit. A number of game media 403 may be arranged on a deck in accordance with selections made in advance by the user. Details will be described later.

The status information may include, for example, the attribute, level, health (HP), attack ability, recovery ability, cost, skill, leader skill, reality, or integrated information. The cost may be a value that consumes a cost set in advance on the deck when a game medium 403 is arranged on the deck. The skill may be a special action taken in the case where the number of actions taken by a game medium 403 becomes a certain number or greater, such as an action for recovering the health of the character 402. The leader skill can be an effect caused when a game medium 403 is arranged as a leader on the deck, such as an effect of increasing the attack ability of a game medium 403 with a particular attribute. The integrated information will be described in detail later.

In addition, the status of a game medium 403 may be strengthened by combining the game medium 403 with another game medium 403.

In addition, as illustrated in exemplary FIG. 1, the screen information generator 11 further can include a preceding object information generator 12.

As illustrated in exemplary FIG. 2, the preceding object information generator 12 generates information for displaying, in the display area 400 of the game screen, preceding object information 408 regarding a plurality of objects 404 arranged in the display area 400 as the character 402 moves.

The shape of the preceding object information 408 is not limited to a particular shape as long as it is distinguishable from the objects 404, for example, and the preceding object information 408 may have an arbitrary shape. Specifically, in order for the user to instantaneously recognize the attribute of an object 404 to be displayed next, it may be desired that the preceding object information 408 be represented in such a manner that the attribute of the next-displayed object 404 is identifiable by color.

The instruction acceptor 20 can accept from the user an instruction regarding an operation of the character 402.

The instruction may include the above-mentioned jump instruction and drop instruction. In the case where the field 401 has a number of levels, for example, as illustrated in exemplary FIG. 3, the drop instruction may be given to move to a lower level.

Accordingly, a game implemented by the exemplary embodiment may be a game intended to reduce the health (HP) of the opponent 405 by causing the character 402 to jump up or drop down in the field 401 to obtain an object 404, and to cause the game medium 403 to attack the opponent 405 on the basis of the obtained object 404.

According to the configuration of the exemplary embodiment, displaying the preceding object information 408 in the display area 400 of the game screen can implement a game with a user-friendly game screen where information necessary for devising a strategy is easy to view, while requiring a user to devise a highly complex strategy.

In addition, the status information on a game medium 403 may include integrated information related to the status of the game medium 403.

The integrated information may be information related to the degree of integration of an attribute parameter that changes in response to contact with an object 404. The information related to the degree of integration may be, for example, an integration ratio of the integrated value of an attribute parameter with respect to a certain preset threshold. Specifically, when the character 402 contacts an object 404, the attribute parameter of a game medium 403 including attribute information that matches the attribute information on the object 404 that the character 402 contacts may increase. The integrated information may be displayed as an attribute gauge 409, for example, as illustrated in exemplary FIG. 2, along with the game medium 403. Although the attribute gauge 409 may visually represent the ratio of the current integrated value with respect to the threshold, the integrated information is not limited thereto. Alternatively, the integrated information may be displayed as a numeral that represents the ratio of the current integrated value of an attribute parameter with respect to a certain threshold.

In addition, as illustrated in exemplary FIG. 1, the screen information generator 11 may further include an integrated information generator 13.

As illustrated in exemplary FIG. 2, the integrated information generator 13 can generate information for displaying, in the display area 400 of the game screen, together with the preceding object information 408 displayed by the preceding object information generator 12, integrated information on each game medium 403 corresponding to a corresponding one of a plurality of objects 404 arranged in the display area 400 as the character 402 moves.

Integrated information on each game medium 403 corresponding to a corresponding one of a plurality of objects 404 arranged in the display area 400 as the character 402 moves may be integrated information on each game medium 403 including attribute information that matches attribute information on a corresponding one of these objects 404. Although the integrated information may be displayed as an attribute gauge 410, the integrated information is not limited to the attribute gauge 410, and, for example, a numeral representing the integration ratio of an attribute parameter may be displayed. In addition, the attribute gauge 410 may be displayed near the preceding object information 408, and, more specifically, it may be desired the attribute gauge 410 be displayed at a position such that the user can simultaneously and instantaneously recognize the preceding object information 408 and the attribute gauge 410.

As described above, the preceding object information 408 can include attribute information on a corresponding one of a plurality of objects 404 arranged in the display area 400 as the character 402 moves, and the integrated information includes the attribute information on each game medium 403. The integrated information generator 13 may generate information for displaying the integrated information on each game media 403 including attribute information that matches attribute information on a corresponding one of a plurality of objects 404 arranged in the display area 400 as the character 402 moves.

Here, the above-mentioned attribute information on the objects 404 will be described in detail with reference to exemplary FIGS. 4a and 4b.

Figure 4A:
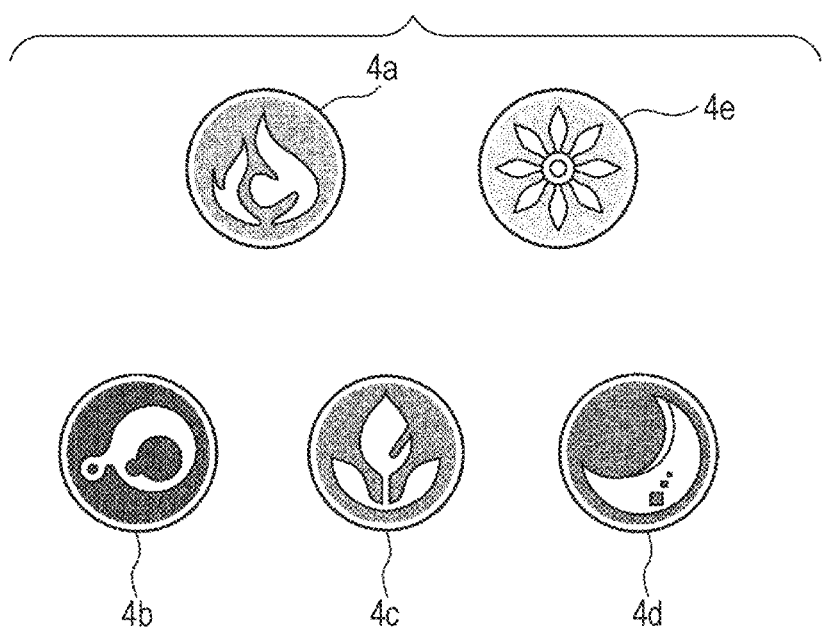
FIG. 4a is an exemplary schematic diagram for describing attribute information.

As illustrated in exemplary FIG. 4a, for example, a fire attribute 4a, a water attribute 4b, a wood attribute 4c, a darkness attribute 4d, or a light attribute 4e is set as attribute information on an object 404, and an object 404 having each item of attribute information may be displayed in red, blue, green, purple, or yellow, respectively. In addition, a rainbow color object 404 is operable to change integrated information on all game media 403, irrespective of the attributes of the game media 403.

Figure 4B:
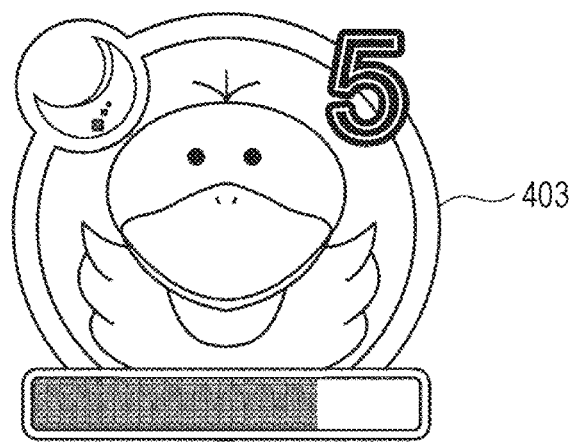
FIG. 4b is an exemplary schematic diagram for describing attribute information.
Figure 5:
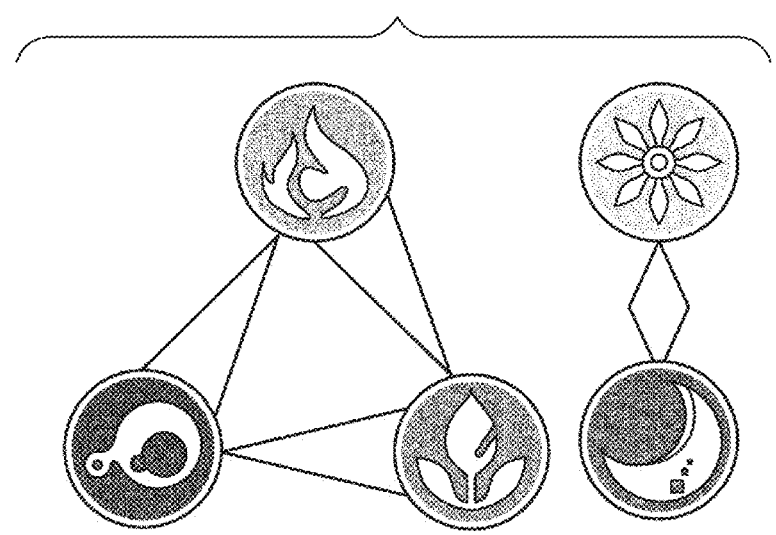
FIG. 5 is an exemplary schematic diagram for describing attribute information.

In addition, like the attribute information on the objects 404, a fire attribute (red), a water attribute (blue), a wood attribute (green), a darkness attribute (purple), or a light attribute (yellow) is set as attribute information on each game medium 403, and, as illustrated in exemplary FIG. 4b, the attribute information on each game medium 403 may be displayed in the upper left-hand part of a character of the game medium 403. Similarly, attribute information is set for the opponent 405, and the attributes of each game medium 403 and the opponent 405 have a power relationship such as that illustrated in exemplary FIG. 5. Specifically, the fire attribute can be stronger than the wood attribute and may be weaker than the water attribute. The water attribute can be stronger than the fire attribute and can be weaker than the wood attribute. The wood attribute can be stronger than the water attribute and can be weaker than the fire attribute. The light and darkness attributes can have a contrasting relationship. A stronger attribute may do double damage to a weaker attribute, and a weaker attribute may do half damage to a stronger attribute, for example.

In addition, as illustrated in exemplary FIG. 1, the controller 10 according to the exemplary embodiment of may include an integrated information changer 14.

As illustrated in exemplary FIG. 2, in the case where the character 402 contacts an object 404 in the display area 400, the integrated information changer 14 can change integrated information on a corresponding game medium 403 on the basis of the object 404 that the character 402 contacts. The integrated information changer 14 may also be configured to change, in a state where an enemy character is arranged on the screen, the integrated information in accordance with the attribute of the enemy character defeated by the user. Furthermore, the integrated information changer 14 may be configured to update the integrated information in accordance with the movement distance of the character 402.

Specifically, as described above, in the case where the character 402 contacts an object 404 in the display area 400, the integrated information changer 14 may increase the attribute parameter of a game medium 403 having attribute information that matches the attribute information on this object 404. For example, in the case where the character 402 contacts an object 404 with the fire attribute, the integrated information changer 14 may increase the attribute parameter of a game medium 403 with the fire attribute, and changes display of the attribute gauge 409.

In addition, as illustrated in exemplary FIG. 1, the controller 10 may include an action actuator 15.

In the case where integrated information satisfies a particular condition, the action actuator 15 causes a game medium 403 corresponding to the integrated information to take an action.

The particular condition may be the attribute parameter of integrated information reaching a certain threshold. Even in the case where the attribute parameter exceeds the threshold, the attribute parameter may be integrated. For example, in the case where the attribute parameter is a value that is about 240% of the threshold, the action may be taken twice. In the case where a number of game media 403 is capable of taking actions, after the game media 403 take their actions in the first round, the game media 403 take their second actions. The remaining about 40% may not be consumed, and the attribute parameter, which is about 40% of the threshold, may be continuously integrated.

The action may be an action of making a normal attack on the opponent 405, for example. This attack may decrease the health (HP) of the opponent 405.

On the condition that the number of actions taken by the game medium 403 becomes a certain number or greater, the action actuator 15 may actuate a special action. The number of actions taken that may be necessary for actuating this special action may be displayed in the upper right-hand corner of the game medium 403, as illustrated in exemplary FIG. 4b.

The special action can correspond to the above-mentioned skill, and may be, for example, an action of making an attack that is more powerful than the normal attack on the opponent 405, an action of recovering the health of the character 402, or an action of making the character 402 invincible. Note that this special action may be actuated in response to an actuation instruction from the user.

The preceding object information generator 12 may generate information for displaying the preceding object information 408 at a position that is forward in the movement direction of the character 402 in the display area 400.

Specifically, the position that is forward in the movement direction may be an arbitrary position on the right end of the display area 400 illustrated in exemplary FIG. 2.

The preceding object information generator 12 may generate information for displaying the preceding object information 408 at a position corresponding to a position where objects 404 are arranged in the display area 400 as the character 402 moves.

Figure 3:
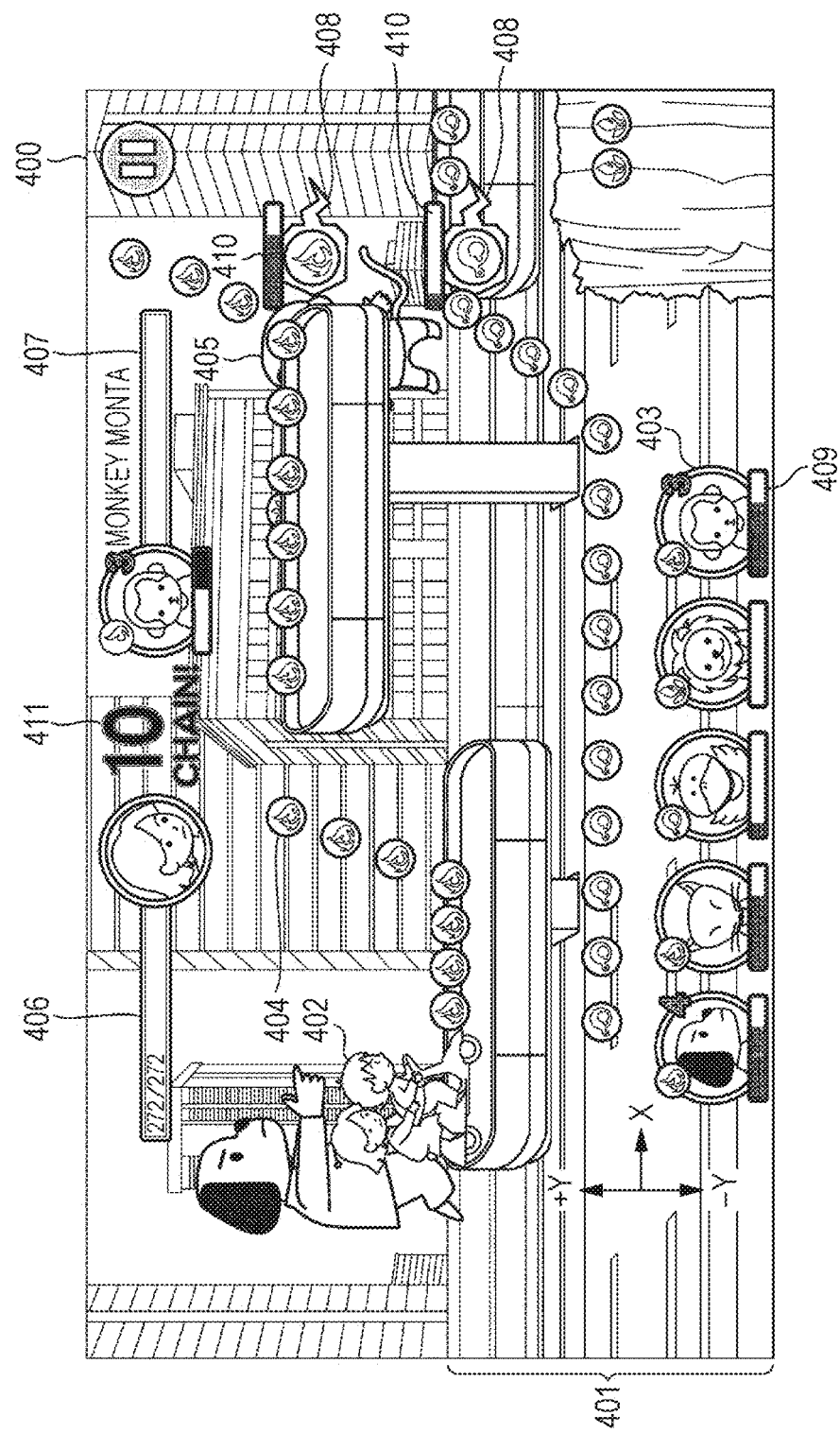
FIG. 3 is an exemplary schematic diagram for describing a field.

Specifically, as illustrated in exemplary FIG. 3, in the case where objects 404 are arranged at a plurality of levels in the vertical direction of the display area 400, the preceding object information 408 may be displayed at a position at a corresponding height.

The preceding object information generator 12 may display the preceding object information 408 in accordance with the distance between the character 402 and a plurality of objects 404 arranged in the display area 400 as the character 402 moves or the relative speed of the character 402 with respect to a plurality of objects 404 arranged in the display area 400 as the character 402 moves.

Specifically, the preceding object information generator 12 may display the preceding object information 408 in the case where the character 402 becomes closer to the objects 404 by a certain distance. This distance may be a distance at which the user is capable of recognizing the preceding object information 408 and operating the character 402 on the basis of the preceding object information 408.

Alternatively, the preceding object information generator 12 may display the preceding object information 408a certain seconds before the objects 404 are displayed, in accordance with the relative speed of the character 402 with respect to the objects 404 (the movement speed of the character 402 and/or objects 404). It may be desired that the certain seconds correspond to a distance at which the user is capable of recognizing the preceding object information 408 and operating the character 402 on the basis of the preceding object information 408.

The status information further includes information on the attack ability of the game medium 403, and the controller 10 may further include an attack ability changer 16, as illustrated in exemplary FIG. 1.

The attack ability changer 16 can change the attack ability of the game medium 403 on the basis of the contact circumstances of the character 402 in the display area 400 with the objects 404 arranged in the field 401.

For example, as illustrated in exemplary FIG. 6, in the case where the objects 404 are displayed in units of multiple objects 404 (the objects 404 are displayed as a group A and a group B in exemplary FIG. 6), when the character 402 contacts all the objects 404 included in one group, the value of a contact parameter may increase by one. In accordance with this increase of the contact parameter value, the attack ability changer 16 may change and increase the attack ability of the game medium 403.

The contact parameter value may increase in accordance with the number of consecutive objects 404 obtained by the user, irrespective of the display state of the objects 404. In this case, when the consecutive obtaining of objects 404 is interrupted, the contact parameter may decrease.

The status information may include information on the defensive strength of the game medium 403, and information on the number of actions taken that are necessary for actuating a special action, and the controller 10 may change the information on the basis of the contact circumstances of the character 402 in the display area 400 with the objects 404 arranged in the field 401. Specifically, on the basis of the contact circumstances, the controller 10 may increase the defensive strength of the character 402, decrease the defensive strength of the opponent 405, or decrease the number of actions taken. Note that the information is not limited to that described above, and may include information on all parameters that are advantageous for the user.

The contact parameter value may be displayed as a numeral 411 in exemplary FIG. 2. In the case where the user suffers a disadvantage as will be described later, the contact parameter value may decrease, and accordingly the attack ability of the game medium 403 may be changed and decreased.

This game may be set to increase the difficulty of the game when the contact parameter value increases to a certain value, and to decrease the difficulty when the contact parameter value decreases. This difficulty may be adjusted by increasing or decreasing traps, as described later. Accordingly, the user may be able to play the game with a difficulty that suits the user's ability, without switching the difficulty while the user is playing the game.

In addition, this game may be configured to cause an effect advantageous to the user when the contact parameter value increases to a certain value. For example, objects 404 that are more than a normal case are temporarily arranged (bonus stage), or an attack more powerful than a normal attack (special attack) is made.

The game is a game in which the character 402 operated by the user may start moving at a certain speed from the start point in the field 401, and, as illustrated in exemplary FIG. 1, the controller 10 may further include a speed changer 17.

Specifically, when the stage starts, the character 402 starts moving in a horizontal direction (the direction of the arrow X in exemplary FIG. 2) at a certain speed from the start point in the field 401. This movement may be enforced movement, instead of being based on a user operation.

The speed changer 17 can change the movement speed of the character 402 on the basis of the contact circumstances of the character 402 in the display area 400 with the objects 404 arranged in the field 401.

Regarding the contact circumstances, as has been described above with reference to exemplary FIG. 6, in the case where the objects 404 are displayed in units of multiple objects 404, when the character 402 contacts all the objects 404 included in one group, the value of the contact parameter may increase by one. In accordance with this increase of the contact parameter value, the speed changer 17 may change and increase the movement speed of the character 402. In the case where the user suffers a disadvantage as will be described later, the contact parameter value may decrease, and accordingly the movement speed of the character 402 may be changed and decreased.

The controller 10 may further include a field changer 18.

In the case where a particular condition is satisfied, the field changer 18 may change the field 401 to a field where disadvantages to be suffered by the character 402 from the field are reduced. In the case where a particular condition is satisfied, the field changer 18 may also change the number or types of objects 404 arranged in the field 401. Specifically, while a particular condition is being satisfied, it may be configured that no objects 404 are arranged in the field 401.

The particular condition is, for example, the condition that the user is likely to pay attention to things other than the character 402, and/or the user's action for changing disadvantages to be suffered by the character 402 from the field 401 or the arrangement of the objects 404 may not be brought into effect. The former is, for example, the case of making an attack by the character 402 or by the opponent 405, who is a character opposing the character 402. Accordingly, the user operation in the field 401 can become alleviated, and the scene where each character 402 makes an attack, for example, may be dynamically displayed without blocking the user operation in the field 401. The latter is, for example, the case where the user has not exhibited a skill that has an effect of reducing disadvantages to be suffered from the field 401. Accordingly, it becomes possible to prevent the effect of a skill exhibited by the user from becoming inactive (meaningless).

The character 402 suffers disadvantages due to, for example, traps. As illustrated in exemplary FIGS. 7a and 7b, the traps can include a hole 1a, a fire ball 1b, a meteor 1c, and an iceberg 1d. In response to contacting these traps, disadvantages such as reduction of the health of the character 402 and/or reduction of the contact parameter may be caused.

Figure 8:
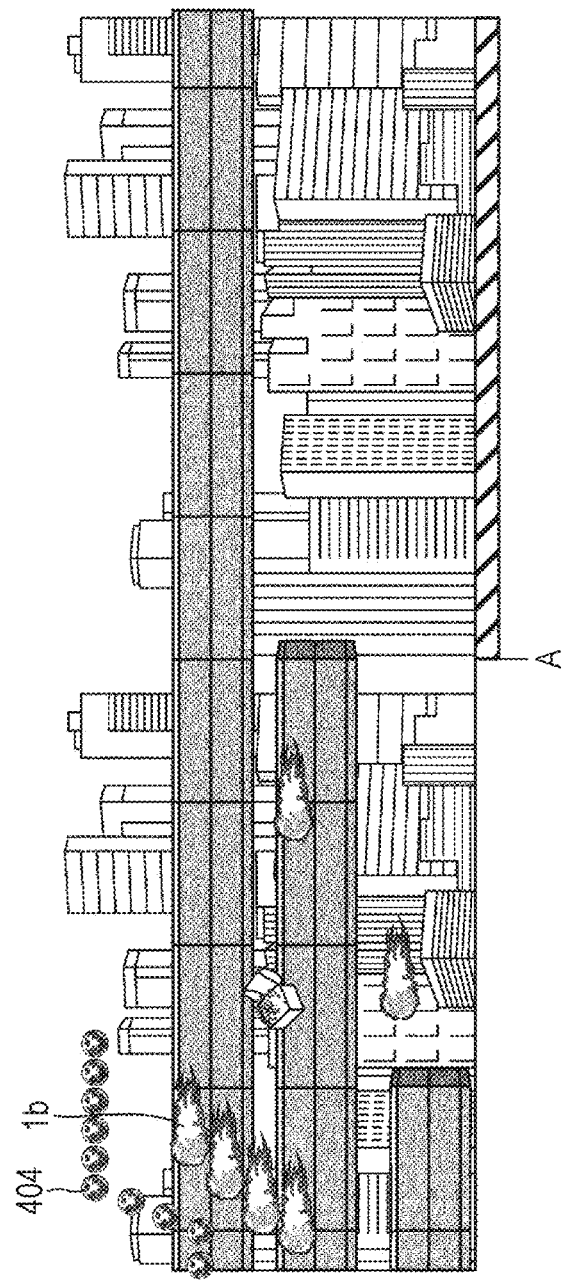
FIG. 8 is an exemplary schematic diagram for describing a field with fewer traps.

Exemplary FIG. 8 can illustrate the field 401 before and after a change made by the field changer 18. The field 401 before the point A in exemplary FIG. 8 can be a normal field, and the field 401 after the point A is a field without disadvantages to be suffered by the character 402. When the above-mentioned condition becomes unsatisfied or after a certain seconds elapse, the field 401 after the change may be changed back to a normal field where there are traps or the like.

In addition, the information processing apparatus 100 may further include an input unit 30, a display unit 40, a communication unit (not shown), and/or a storage unit 50.

The input unit 30 may accept an operation 61*a* of touching and/or dragging by the user. In the exemplary embodiment, the input unit 30 may be a touchscreen capable of detecting multi-touching, or a similar device. The method of entering an input to the information processing apparatus 100 is not limited to the operation 61*a* using the touchscreen (alternatively, for example, an input may be entered by pressing a certain input key).

Alternatively, the input unit 30 may be a device capable of detecting the operation 61*a* performed by the user (for example, a touch surface included in the touchscreen). The input unit 30 may output an input signal 61*b*, in response to the operation 61*a*, to the instruction acceptor 20.

The instruction acceptor 20 may output information 61*c* or the like, based on the timing of receiving an input of the input signal 61*b* from the input unit 30, to the controller 10.

The communication unit can communicate with the outside via a communication network conforming to a certain communication system. In some exemplary embodiments, communication unit may only have an essential function that implements communication with an external device (such as another mobile terminal used by another user, or a server apparatus), and there are no limitations regarding a communication line, a communication system, or a communication medium. The communication unit may be a device such as an Ethernet® adapter. In addition, the communication unit may use a communication system or a communication medium such as Institute of Electrical and Electronic Engineers (IEEE) 802.11 wireless communication or Bluetooth (registered trademark). The communication unit includes a receiving section and a transmitting section.

The receiving section can receive information regarding a game medium 403 of another user from another mobile terminal operated by this other user and/or a server apparatus.

The transmitting section can transmit information regarding the game medium 403 of the user to another mobile terminal operated by another user and/or a server apparatus.

The display unit 40 may be a device that displays a game screen. In the exemplary embodiment, the display unit 40 may be a liquid crystal display. Note that exemplary FIG. 1 separately illustrates the input unit 30 and the display unit 40 in order to clearly illustrate the functions of the input unit 30 and the display unit 40. However, for example, in the case where the input unit 30 is a touchscreen and the display unit 40 is a liquid crystal display, it may be desired that the input unit 30 and the display unit 40 be integrally configured.

The storage unit 50 is a storage device configured by an arbitrary recording medium such as a non-transitory storage medium, hard disk, a silicon state drive (SSD), a semiconductor memory, or a digital versatile disc (DVD), and stores a game program capable of controlling the information processing apparatus 100, and data.

Next, a specific flow of a game implemented by the information processing apparatus 100 will be described with reference to exemplary FIG. 9.

A game implemented by this exemplary embodiment can configure, for example, a drama action roll-playing game (RPG) that proceeds in which deck configuration, stage completing, collecting game media 403, and strengthening game media 403 serve as one cycle, and a horizontal-scrolling run action game is played at each stage.

Figure 9:
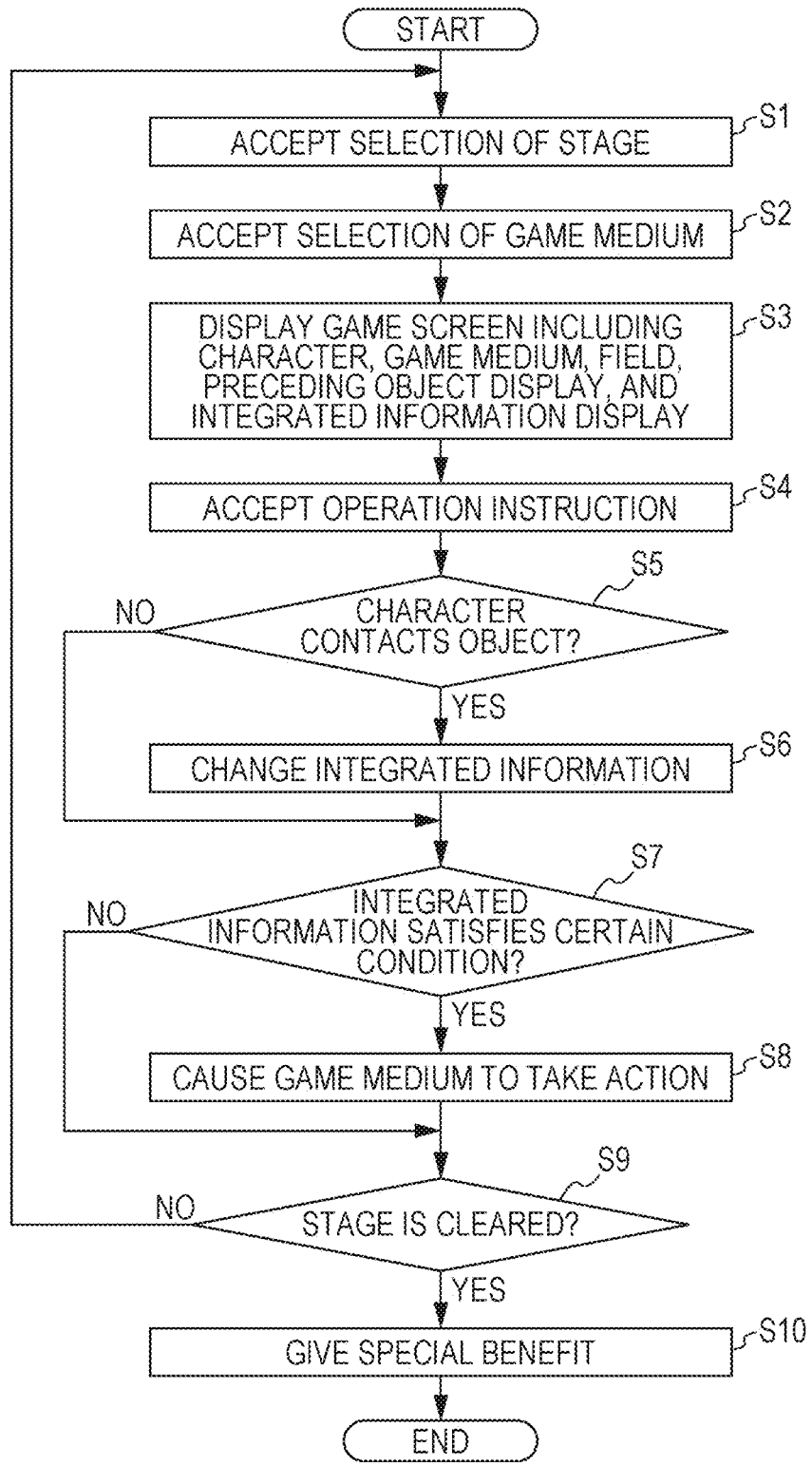
FIG. 9 is an exemplary flowchart for describing a specific flow of a game.

As illustrated in exemplary FIG. 9, the information processing apparatus 100 according to the exemplary embodiment can first accept selection of an arbitrary stage from the user, from among stages that are presented and playable, on a stage selecting screen (S1). Next, on a deck configuration screen, the information processing apparatus 100 can accept selection of a certain number of game media 403 from the user, from among game media 403 owned by the user, and can generate a deck with the selected game media 403 (S2). Thereafter, the information processing apparatus 100 can start a run action game on the selected stage, and displays a corresponding game screen (S3).

Next, the information processing apparatus 100 can accept an operation instruction from the user in order to operate the character 402 in the field 401 (S4). In the case where it is determined that the character 402 has contacted an object 404 (S5), the information processing apparatus 100 can change integrated information on a corresponding game medium 403 (S6). In the case where it is determined that the integrated information satisfies a certain condition (S7), the information processing apparatus 100 can cause the game medium 403 to take an action, such as making an attack on the opponent 405 (S8). In the case where it is determined that the stage is completed (S9), the information processing apparatus 100 can give the user a new game medium 403 or in-game money as a special reward (S10). In the case where it is determined that the stage is not completed (S9), the information processing apparatus 100 may not give the user a special reward, and can display the stage selecting screen (S1).

Information regarding a game medium 403 may be uploaded to a server apparatus connected to be capable of communicating with the information processing apparatus 100, which is a mobile terminal. On the deck configuration screen, the user may arrange a game medium 403 of another user on the deck. Similarly, the game medium 403 of the user may be arranged on a deck of another user.

Game media 403 of other users, displayed as arrangeable game media 403, may be extracted and presented by the server apparatus on a certain condition. For example, other users who have played this game for a time duration close to that of the user are extracted, and, among game media 403 owned by these extracted other users, a game medium 403 that has an attribute determined to be appropriate on the basis of the attribute of a game medium 403 arranged on the user's deck is presented.

Technology of the exemplary embodiments described herein may be applicable to a simulation game or a first-person shooter, for example, besides an action game including a horizontal-scrolling run game.

In the first exemplary embodiment described above, the case has been described in which the information processing apparatus 100 may be a mobile terminal including the controller 10 and the instruction acceptor 20, and a game screen may be displayed on the display unit 40 included in the mobile terminal on the basis of information generated by the screen information generator 11 of the controller 10.

Next, the case will be described in which the information processing apparatus 100 is a server apparatus including the controller 10 and the instruction acceptor 20, and a game screen is displayed on a display unit included in a mobile terminal connected to the server apparatus via a network, on the basis of information generated by the screen information generator 11 of the controller 10.

Figure 10:
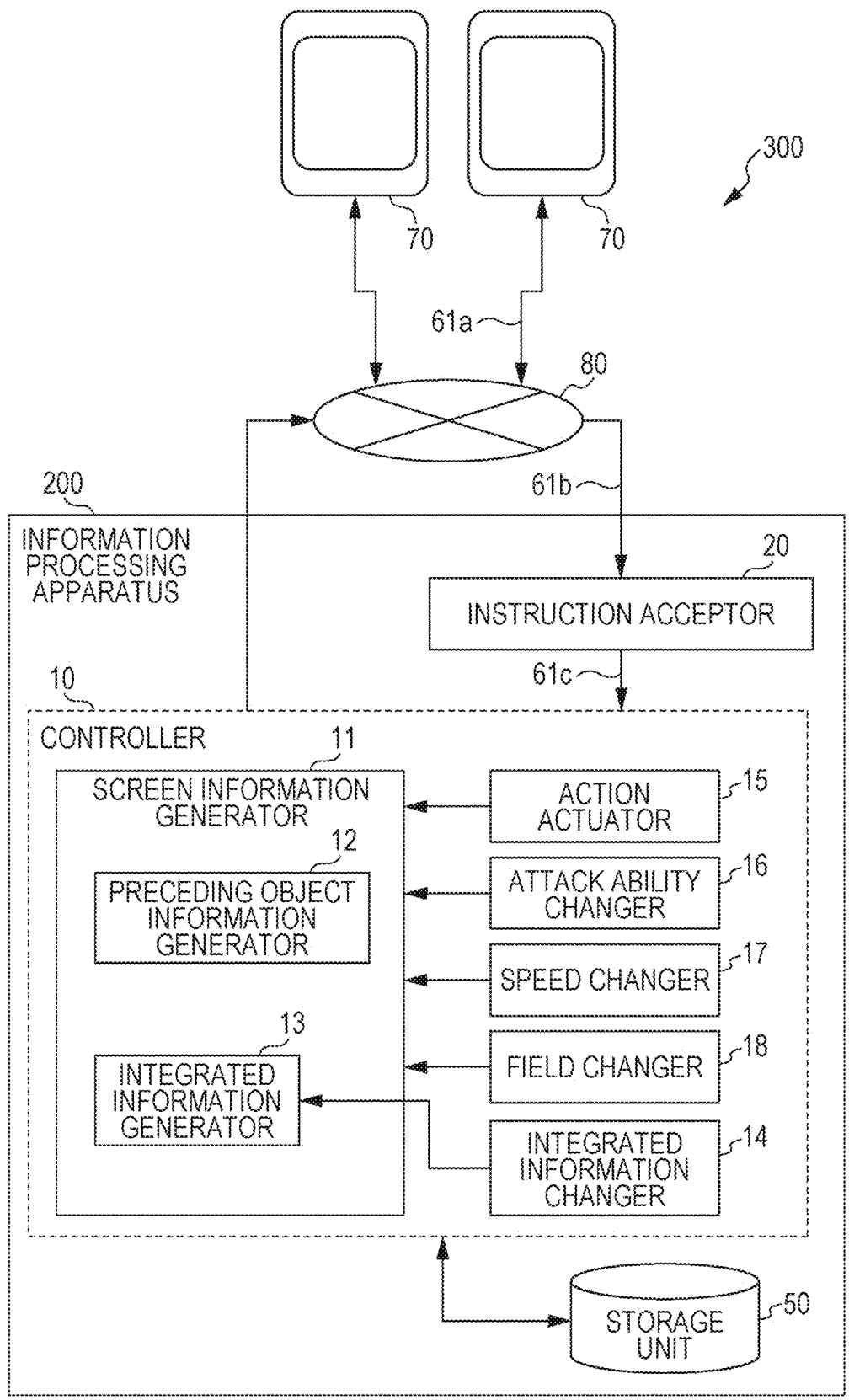
FIG. 10 illustrates an example of a schematic block diagram of an information processing apparatus and a game system.

Next, the second exemplary embodiment of the present invention will be described with reference to exemplary FIG. 10. Exemplary FIG. 10 is a schematic diagram illustrating the configuration of a game system 300 including mobile terminals 70 and an information processing apparatus 200 serving as a server apparatus. As illustrated in exemplary FIG. 10, the information processing apparatus 200 according to the exemplary embodiment can function as a server apparatus connected via a certain network 80 to be communicable with each mobile terminal 70, and a game program according to the exemplary embodiment can be executed on the server apparatus.

The information processing apparatus 200 serving as a server apparatus can include some or all of the elements (particularly the controller 10) described as being included in the information processing apparatus 100 serving as a mobile terminal in the first embodiment, and the information processing apparatus 200 can transmit a game output result to each mobile terminal 70 on the basis of an input given to the mobile terminal 70.

A progress screen of this game may be web display displayed on each mobile terminal 70 on the basis of data generated by the information processing apparatus 200, and other screens such as a menu screen may be native display displayed by a native application installed in the mobile terminal 70. In doing so, the game may be a hybrid game where the information processing apparatus 200 and the mobile terminal 70 each perform part of the processing.

Even in the case where the game program according to the exemplary embodiment is implemented as a native application executed on each mobile terminal 70, the mobile terminal 70 may access the information processing apparatus 200 as needed, and may download and use information regarding the progress of the game (such as information regarding the user, information regarding another user who is a friend of the user's, information regarding the accumulated points, items, and characters given to the user, and information regarding a ranking of the user). Further, the game may be a multi-playing game by having mobile terminals that are connected to be communicable with each other and synchronizing these mobile terminals (for example, so-called peer-to-peer communication such as short-distance wireless communication using Bluetooth®.

Next, a game processing method according to the exemplary will be described with reference to the drawings.

Figure 11:
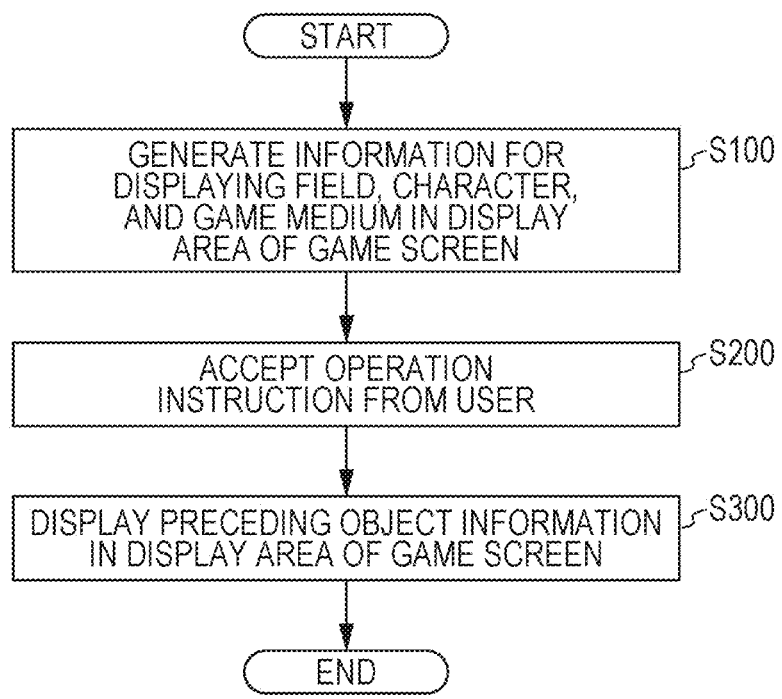
FIG. 11 is an exemplary flowchart for describing the flow of a game processing method.

As illustrated in exemplary FIG. 11, the game processing method according to the exemplary embodiment can cause a computer to execute a screen information generating step S100 and an instruction accepting step S200.

The screen information generating step S100 can generate information for displaying, in the display area 400 of the game screen, a field 401 where a number of objects 404 are arranged, a character 402 capable of moving in the field 401, and a game medium 403 having status information including certain integrated information. This screen information generating step S100 may be processed by the above-described screen information generator 11. The details have been described as above in the exemplary embodiments.

The instruction accepting step S200 can accept, from the user, an instruction regarding an operation of the character 402. This instruction accepting step S200 may be processed by the above-described instruction acceptor 20. The details have been described as above in the exemplary embodiments.

The screen information generating step S100 can include a preceding object information generating step S300 of generating information for displaying, in the display area 400 of the game screen, preceding object information 408 regarding a number of objects 404 arranged in the display area 400 as the character 402 moves. This preceding object information generating step S300 may be processed by the above-described preceding object information generator 12. The details have been described as above in the exemplary embodiments.

Finally, a game program according to the exemplary embodiment will be described.

The game program according to the exemplary embodiment can cause a computer to implement a screen information generating function and an instruction accepting function.

The screen information generating function can generate information for displaying, in the display area 400 of the game screen, a field 401 where a plurality of objects 404 is arranged, a character 402 capable of moving in the field 401, and a game medium 403 having certain status information. This screen information generating function may be implemented by the above-described screen information generator 11. The details have been described in exemplary embodiments above.

The instruction accepting function can accept, from the user, an instruction regarding an operation of the character 402. This instruction accepting function may be processed by the above-described instruction acceptor 20. The details have been described as above in the exemplary embodiments.

The screen information generating function can include a preceding object information generating function of generating information for displaying, in the display area 400 of the game screen, preceding object information 408 regarding a plurality of objects 404 arranged in the display area 400 as the character 402 moves. This preceding object information generating function may be implemented by the above-described preceding object information generator 12. The details have been described as above in the exemplary embodiments.

A control block (for example, the controller 10) of the information processing apparatus 100 or 200 may be implemented by a logic circuit (hardware) formed in an integrated circuit (integrated circuit (IC) chip) or the like or by software using a central processing unit (CPU). In the latter case, the information processing apparatus 100 or 200 can include the CPU that executes instructions of the game program which is software implementing the individual functions, a read-only memory (ROM) or storage device (referred to as a "recording medium" or "storage medium") on which the game program and various kinds of data are recorded in a computer (or CPU) readable manner, and a random access memory (RAM) to which the game program is loaded. The computer (or the CPU) can read the game program from the recording medium and executes the game program, thereby attaining the object of the exemplary embodiments. As the recording medium, a "non-transitory tangible medium", or "non-transitory storage medium", for example, a tape, a disc, a card, a semiconductor memory, or a programmable logic circuit can be used. In addition, the game program may be provided to the computer via any given transmission media capable of transmitting the game program (such as a communication network or a broadcast wave). Exemplary embodiments described herein can be implemented as a data signal on a carrier wave, in which the game program is embodied by electronic transmission.

The game program can be written in, for example, a script language such as ActionScript or JavaScript® an object-oriented programming language such as Objective-C or Java® or a markup language such as HyperText Markup Language 5 (HTML5). The game system 300 including an information processing terminal (e.g., the mobile terminal 70) which includes units that implement some of functions implemented by the game program and a server (e.g., the information processing apparatus 200) which includes units that implement the rest of the functions different from the some functions is also within the scope of the present invention.

The above description only illustrates examples of the representative embodiments, and the present invention is not construed to be limited to these embodiments.

What is claimed is:

1. A computer implemented method for controlling a game, comprising executing on a processor the steps of:
    generating and displaying, on a display area of a game screen, a game field comprising a plurality of objects and a character movable in the field;
    retrieving, from a storage memory, an initial enforced movement speed, and setting a speed of the character in an initial game state to the initial enforced movement speed;
    automatically moving the character according to the initial enforced movement speed in a first direction of movement prior to receiving player input, and, after moving the character according to the initial enforced movement speed, determining, based on progression of the game, an adjustment to at least one of the initial enforced movement speed and the first direction of movement, and updating at least one of a movement speed of the character to a new movement speed or a direction of movement to a new direction of movement based on the adjustment;
    displaying, in the display area of the game screen, with a preceding object information generating function, preceding object information regarding a plurality of objects to be arranged in the display area as the character moves;
    wherein the preceding object information generating function comprises:
    determining that a preceding object is outside of the display area and is approaching the display area,
    determining whether the preceding object is within a certain distance outside of the display area by determining whether the preceding object is less than or equal to the certain distance outside of an outer edge of the display area;
    when the preceding object is within the certain distance outside of the display area, changing a state of displaying the preceding object information from a disabled state to an enabled state; and
    when the preceding object is greater than the certain distance away from the display area, leaving the state of displaying the preceding object information in the disabled state and continuously adjusting a distance between the preceding object and the display area.

2. The computer implemented method for controlling the game according to claim 1, wherein the adjustment is made to at least the initial movement speed;
    wherein determining the adjustment to the initial enforced movement speed comprises determining that the character has contacted an obstacle object; and
    wherein adjusting the movement speed to the new movement speed comprises applying a disadvantage to the character comprising a reduction in movement speed associated with contacting the obstacle object, and moving the character according to a reduced movement speed after applying the disadvantage.

3. The computer implemented method for controlling the game according to claim 1, wherein the adjustment is made to at least the first direction of movement;
    wherein determining the adjustment to the first direction of movement comprises:
    receiving a control instruction from a user, said control instruction providing a movement direction instruction selected from at least two possible direction instructions; and
    updating the direction of movement to the new direction of movement based on a combination of the first direction of movement and the movement direction instruction.

4. The computer implemented method for controlling the game according to claim 3, wherein updating the direction of movement to the new direction of movement comprises:
    representing the initial enforced movement speed in the first direction of movement as a first vector;
    generating, based on the movement direction instruction, a second vector;
    generating a resultant vector from the first vector and the second vector; and
    using a direction of the resultant vector as the new direction of movement.

5. The computer implemented method for controlling the game according to claim 1, wherein the preceding object is associated with a particular color in a set of colors, and wherein changing the state of displaying the preceding object information from the disabled state to the enabled state further comprises displaying, on the display area of the game screen, a visual element having the particular color.

6. The computer implemented method for controlling the game according to claim 1, further comprising executing, on the processor, steps of:
    obtaining, with the character, an object in the plurality of objects that is provided in the display area;
    determining whether an attribute of a game medium associated with the character matches attribute information of the object, wherein the attribute of the game medium associated with the character and the attribute information of the object are determined to match in a case where the attribute of the game medium associated with the character and the attribute information of the object are associated with at least one matching color; and
    in a case where the attribute of the game medium associated with the character and the attribute information of the object match, updating a status of the character based on the object.

7. The computer implemented method for controlling the game according to claim 6, wherein the attribute information of the object is one of: associated with one matching color, or associated with every color in a set of colors including the one matching color.

8. The computer implemented method for controlling the game according to claim 6, further comprising executing, on the processor, steps of:
    obtaining, with the character, a plurality of consecutive objects in the plurality of objects that is provided in the display area, and determining a number of consecutive objects obtained by the character;
    updating the status of the character based on the number of consecutive objects obtained with the character;

after determining that the character has obtained the number of consecutive objects, identifying an interruption in consecutive obtaining of objects by the character; and reverting the status of the character to a previous status.

9. The computer implemented method for controlling the game according to claim 8, wherein updating the status of the character comprises increasing, each time the number of consecutive objects obtained by the character is raised, a parameter of the character; and wherein reverting the status of the character to a previous status comprises lowering the parameter.

10. A computer implemented method for controlling a game, comprising executing on a processor the steps of:

generating and displaying, on a display area of a game screen, a game field comprising a plurality of objects and a character movable in the field;

moving the character, and displaying, in the display area of the game screen, with a preceding object information generating function, preceding object information regarding a plurality of objects to be arranged in the display area as the character moves;

wherein the preceding object information generating function comprises:

determining that a preceding object is outside of the display area and is approaching the display area;

determining that the preceding object is approaching the display area at a relative speed value, the relative speed value being a relative speed of the character with respect to a plurality of objects arranged in the display area as the character moves, and determining whether the preceding object is within a certain number of seconds from being displayed based on the relative speed value and a distance of the preceding object;

when the preceding object is within the certain number of seconds from being displayed, changing a state of displaying the preceding object information from a disabled state to an enabled state; and when the preceding object is not within the certain number of seconds from being displayed, leaving the state of displaying the preceding object information in the disabled state and continuously adjusting the distance between the preceding object and the display area.

11. The computer implemented method for controlling the game according to claim 10, further comprising executing, on the processor, steps of:

moving the character according to an initial enforced movement speed in a first direction of movement;

after moving the character according to the initial enforced movement speed, determining, based on progression of the game, an adjustment to at least one of the initial enforced movement speed and the first direction of movement; and updating at least one of a movement speed of the character to a new movement speed or a direction of movement to a new direction of movement based on the adjustment.

12. The computer implemented method for controlling the game according to claim 11, wherein the adjustment is made to at least the initial movement speed;

wherein determining the adjustment to the initial enforced movement speed comprises determining that the character has contacted an obstacle object; and wherein adjusting the movement speed to the new movement speed comprises applying a disadvantage to the character comprising a reduction in movement speed associated with contacting the obstacle object, and moving the character according to a reduced movement speed after applying the disadvantage.

13. The computer implemented method for controlling the game according to claim 11, wherein the adjustment is made to at least the first direction of movement;

wherein determining the adjustment to the first direction of movement comprises:

receiving a control instruction from a user, said control instruction providing a movement direction instruction selected from at least two possible direction instructions; and updating the direction of movement to the new direction of movement based on a combination of the first direction of movement and the movement direction instruction.

14. The computer implemented method for controlling the game according to claim 13, wherein updating the direction of movement to the new direction of movement comprises:

representing the initial enforced movement speed in the first direction of movement as a first vector;

generating, based on the movement direction instruction, a second vector;

generating a resultant vector from the first vector and the second vector; and using a direction of the resultant vector as the new direction of movement.

15. The computer implemented method for controlling the game according to claim 10, wherein the preceding object is associated with a particular color in a set of colors, and wherein changing the state of displaying the preceding object information from the disabled state to the enabled state further comprises displaying, on the display area of the game screen, a visual element having the particular color.

16. The computer implemented method for controlling the game according to claim 10, further comprising executing, on the processor, steps of:

obtaining, with the character, an object in the plurality of objects that is provided in the display area;

determining whether an attribute of a game medium associated with the character matches attribute information of the object, wherein the attribute of the game medium associated with the character and the attribute information of the object are determined to match in a case where the attribute of the game medium associated with the character and the attribute information of the object are associated with at least one matching color; and in a case where the attribute of the game medium associated with the character and the attribute information of the object match, updating a status of the character based on the object.

17. The computer implemented method for controlling the game according to claim 16, wherein the attribute information of the object is one of: associated with one matching color, or associated with every color in a set of colors including the one matching color.

18. The computer implemented method for controlling the game according to claim 16, further comprising executing, on the processor, steps of:

obtaining, with the character, a plurality of consecutive objects in the plurality of objects that is provided in the display area, and determining a number of consecutive objects obtained by the character;

updating the status of the character based on the number of consecutive objects obtained with the character;

after determining that the character has obtained the number of consecutive objects, identifying an interruption in consecutive obtaining of objects by the character; and reverting the status of the character to a previous status.

19. An information processing system comprising:

a computer having at least one processor, at least one memory, and a display, the computer further comprising:

a screen information generator configured to generate information for displaying, in a display area of a game screen, a field where a plurality of objects is arranged and a character movable in the field;

wherein the screen information generator includes a preceding object information generator configured to generate information for displaying, in the display area of the game screen, preceding object information regarding a plurality of objects to be arranged in the display area as the character moves;

wherein the processor is configured to retrieve, from the memory, an initial enforced movement speed, and is configured to set a speed of the character in an initial game state of a game to the initial enforced movement speed;

wherein the processor is further configured to automatically move the character according to the initial enforced movement speed in a first direction of movement prior to receiving player input;

wherein the processor is further configured to, after moving the character according to the initial enforced movement speed, determine, based on progression of the game, an adjustment to at least one of the initial enforced movement speed and the first direction of movement, and is configured to update at least one of a movement speed of the character to a new movement speed or a direction of movement to a new direction of movement based on the adjustment;

wherein the preceding object information generator is configured to execute steps of:

determining that a preceding object is outside of the display area and is approaching the display area, determining whether the preceding object is within a certain distance outside of the display area by determining whether the preceding object is less than or equal to the certain distance outside of an outer edge of the display area;

when the preceding object is within the certain distance outside of the display area, changing a state of displaying the preceding object information from a disabled state to an enabled state; and when the preceding object is greater than the certain distance away from the display area, leaving the state of displaying the preceding object information in the disabled state and continuously adjusting a distance between the preceding object and the display area.

20. An information processing system comprising:

a computer having at least one processor, at least one memory, and a display, the computer further comprising:

a screen information generator configured to generate information for displaying, in a display area of a game screen, a field where a plurality of objects is arranged and a character movable in the field;

wherein the screen information generator includes a preceding object information generator that generates information for displaying, in the display area of the game screen, preceding object information regarding a plurality of objects to be arranged in the display area as the character moves;

wherein the preceding object information generator is configured to execute steps of:

determining that a preceding object is outside of the display area and is approaching the display area;

determining that the preceding object is approaching the display area at a relative speed value, the relative speed value being a relative speed of the character with respect to a plurality of objects arranged in the display area as the character moves, and determining whether the preceding object is within a certain number of seconds from being displayed based on the relative speed value and a distance of the preceding object;

when the preceding object is within the certain number of seconds from being displayed, changing a state of displaying the preceding object information from a disabled state to an enabled state; and when the preceding object is not within the certain number of seconds from being displayed, leaving the state of displaying the preceding object information in the disabled state and continuously adjusting the distance between the preceding object and the display area.

* * * * *